W. N. Pelton,
Ring,
No. 76,517. Patented Apr. 7, 1868.
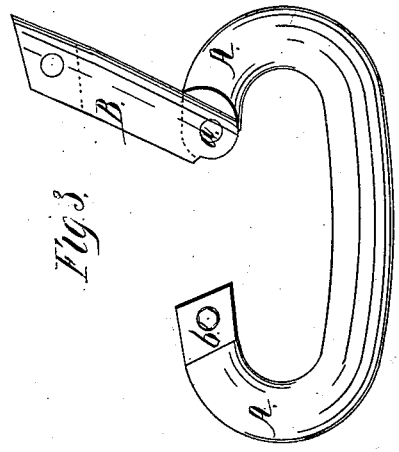
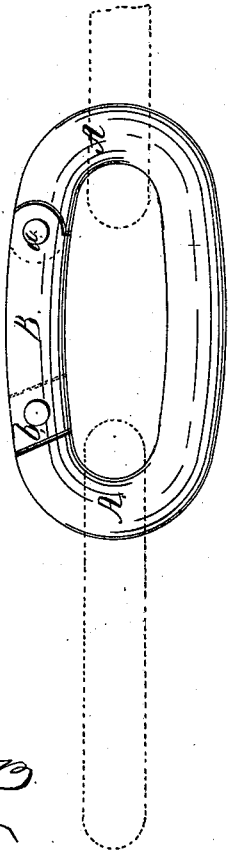
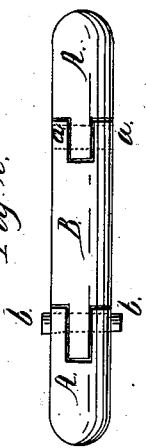
Witnesses:
Inventor:
W. N. Pelton
per Munn & Co.
Attorneys

United States Patent Office.

WILLIAM N. PELTON, OF NEW LONDON, CONNECTICUT.

Letters Patent No. 76,517, dated April 7, 1868.

IMPROVED CONNECTING-LINK.

The Schedule referred to in these Letters Patent and making part of the same.

TO ALL WHOM IT MAY CONCERN:

Be it known that I, WILLIAM N. PELTON, of New London, in the county of New London, and State of Connecticut, have invented a new and improved Connecting-Link; and I do hereby declare that the following is a full, clear, and exact description thereof, which will enable others-skilled in the art to make and use the same, reference being had to the accompanying drawings, forming part of this specification, in which—

Figure 1 represents a side view of my improved link closed.

Figure 2 is an edge view of the same.

Figure 3 is a side view of the same when open.

Similar letters of reference indicate corresponding parts.

This invention relates to a new connecting-link for chains and other purposes, and consists in the use of a link, in which a portion is hinged to the body, and can be fastened with its free end, by means of a pin, to the same.

A, in the drawing, represents a metal bar, bent at its two ends so as to form a double hook. To one of its ends is pivoted, by means of a pin, $a$, a bar, B, as is clearly shown in the drawings. The free end of one of the bars is slotted, and that of the other has a tenon, which, when the free ends are placed together, as in figs. 1 and 2, fits into the slot, so that the two bars together form a complete link. The slotted and tenoned free ends are perforated, so that they can be locked together by means of a somewhat conical pin, $b$.

This invention is applicable not only for connecting the ends of two pieces of chain, but also wherever hooks are now employed, as, when the link is opened, as in fig. 3, the device can be hooked into rings or other articles, and can then be closed, so that the projecting point of the hook may be hidden.

On shipboard, for harnesses, and for many other purposes, this invention will be found of great practical use, as it can be very quickly applied and closed.

It will be noticed that no rivets are to be employed for closing this link, without which none of the other connecting-links can be closed.

Having described my invention, what I claim as new, and desire to secure by Letters Patent, is—

A connecting-link, consisting of the body A, and of the bar B pivoted to the same, all made and operating substantially as described, for the purpose specified.

WILLIAM N. PELTON.

Witnesses:
WM. F. MCNAMARA,
ALEX. F. ROBERTS.